US010816673B2

(12) United States Patent
Nayyar et al.

(10) Patent No.: US 10,816,673 B2
(45) Date of Patent: Oct. 27, 2020

(54) MEMORY OPTIMIZED GNSS CORRELATOR

(71) Applicant: Texas Instruments Incorporated, Dallas, TX (US)

(72) Inventors: Jasbir Singh Nayyar, Khanna (IN); Sreenath Narayanan Potty, Trivandrum (IN); Sunil Chomal, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 670 days.

(21) Appl. No.: 14/919,710

(22) Filed: Oct. 21, 2015

(65) Prior Publication Data
US 2017/0115400 A1    Apr. 27, 2017

(51) Int. Cl.
G01S 19/30    (2010.01)
H04B 1/7075    (2011.01)

(52) U.S. Cl.
CPC .......... *G01S 19/30* (2013.01); *H04B 1/70752* (2013.01)

(58) Field of Classification Search
CPC .. H01B 1/70752; H01B 1/709; H01B 1/7095; G01S 19/30
USPC ......................................................... 375/149
See application file for complete search history.

(56) References Cited

U.S. PATENT DOCUMENTS

| | | | | |
|---|---|---|---|---|
| 6,459,407 B1* | 10/2002 | Akopian | ................. | G01S 19/30 342/357.25 |
| 2007/0274374 A1* | 11/2007 | Abraham | ................ | G01S 19/30 375/148 |
| 2008/0205492 A1* | 8/2008 | Gorday | ................... | H04B 1/709 375/150 |
| 2009/0213006 A1* | 8/2009 | Nayyar | ................... | G01S 19/30 342/357.36 |
| 2009/0224973 A1* | 9/2009 | Nayyar | ................... | G01S 19/30 342/357.42 |
| 2015/0091754 A1* | 4/2015 | Komaili | ................. | G01S 19/30 342/357.69 |

OTHER PUBLICATIONS

V. Eerola et al., A Novel Flexible Correlator Architecture for GNSS Receivers, Proceedings of the Institute of Navigation, National Technical Meeting, p. 681-691, 2007 (Year: 2007).*

(Continued)

*Primary Examiner* — Bernarr E Gregory
*Assistant Examiner* — Fred H Mull
(74) *Attorney, Agent, or Firm* — Ebby Abraham; Charles A. Brill; Frank D. Cimino

(57) ABSTRACT

A personal navigation device includes a correlator for processing GNSS signals from a constellation of satellites A signal is received from a navigation beacon containing a repeating code word, in which the code word includes a number N of samples corresponding to N phases, and in which reception of each code word occurs within a defined time period T. The sequence of N code samples is correlated with a known code word to determine a maximum value of correlation for a particular phase of the received signal. The correlation is performed using a correlator of size M, in which M is less than N, such that N/M=P complete correlations for a partial code phase are performed such that each correlation of a partial code phase is performed within a time period of approximately T/P. All P correlations of partial code phases are completed within time T.

12 Claims, 5 Drawing Sheets

(56) References Cited

OTHER PUBLICATIONS

"GNSS Receivers General Introduction", Navipedia, available at http://www.navipedia.ent/index.php/GNSS_General_Introduction on May 5, 2015, pp. 1-4.

"Galileo Receivers", Navipedia, available at http://www.navipedia.net/index.php/GALILEO_Receivers on May 5, 2015, pp. 1-5.

"Generic Receiver Description", Navipedia, available at http://www.navipedia.net/index.php/ Generic_Receiver_Description on May 5, 2015, pp. 1-4.

* cited by examiner

MEMORY OPTIMIZED GNSS CORRELATOR

FIELD OF THE INVENTION

This invention generally relates to global navigation systems, and in particular to the European Galileo system and similar systems.

BACKGROUND OF THE INVENTION

A satellite navigation system is a system of satellites that provide autonomous geo-spatial positioning with global coverage. It allows small electronic receivers to determine their location (longitude, latitude, and altitude) with a high precision using time signals transmitted along a line of sight by radio from satellites. The signals also allow the electronic receivers to calculate the current local time to high precision, which allows time synchronization. A satellite navigation system with global coverage may be termed a global navigation satellite system (GNSS).

As of 2015, only the United States NAVSTAR Global Positioning System (GPS) and the Russian GLONASS are global operational GNSSs. China is in the process of expanding its regional BeiDou Navigation Satellite System into the global COMPASS navigation system by 2020. The European Union's Galileo positioning system is a GNSS in initial deployment phase, scheduled to be operational by 2016. France, India, and Japan are in the process of developing regional navigation systems.

Global coverage for each system is generally achieved by a satellite constellation of 20-30 medium Earth orbit (MEO) satellites spread between several orbital planes. The actual systems vary, but use orbital inclinations of >50° and orbital periods of roughly twelve hours (at an altitude of about 20,000 kilometers (12,000 mi)).

BRIEF DESCRIPTION OF THE DRAWINGS

Particular embodiments in accordance with the invention will now be described, by way of example only, and with reference to the accompanying drawings.

Figure 1:
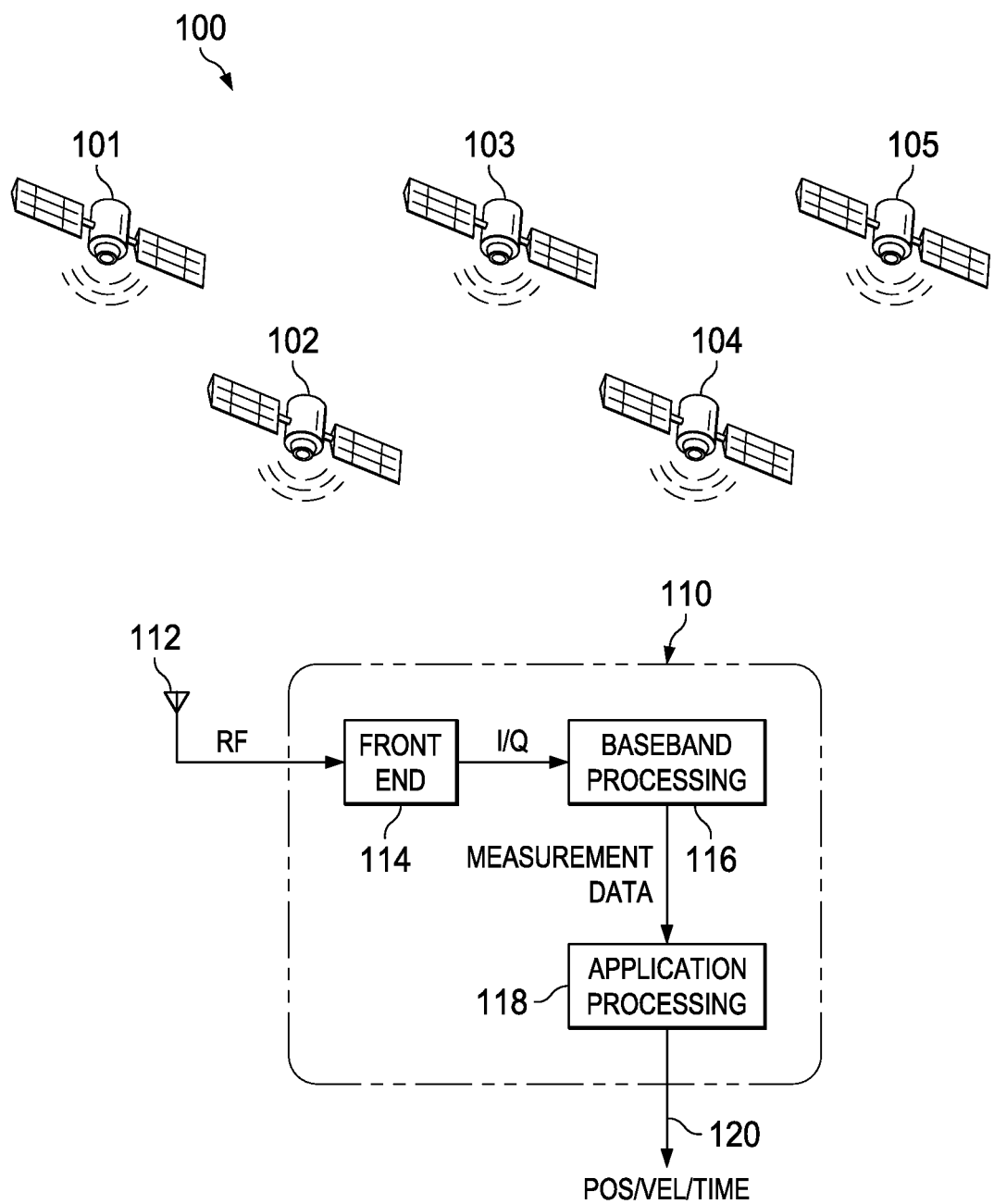
FIG. 1 is a system view of a receiver in a personal navigation device, according to one or more embodiments of the invention.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The general principles of operation of the GPS concept are well known; see, e.g. "GNSS Receivers General Introduction", Navipedia, 18 Sep. 2014, which is incorporated by reference herein. The GPS concept is based on time. The satellites carry very stable atomic clocks that are synchronized to each other and to ground clocks. Any drift from true time maintained on the ground is corrected daily. Likewise, the satellite locations are monitored precisely. GPS receivers have clocks as well—however, they are not synchronized with true time, and are less stable. GPS satellites continuously transmit their current time and position. A GPS receiver monitors multiple satellites and solves equations to determine the exact position of the receiver and its deviation from true time. At a minimum, four satellites must be in view of the receiver for it to compute four unknown quantities (three position coordinates and clock deviation from satellite time).

Each GPS satellite continually broadcasts a signal (carrier frequency with modulation) that includes a pseudorandom number (PRN) code and a message. The pseudorandom code (sequence of ones and zeros) is known to the receiver. By time-aligning (correlating) a receiver-generated version and the receiver-measured version of the code, the time of arrival (TOA) of a defined point in the code sequence, called an epoch, can be found in the receiver clock time scale. The message includes the time of transmission (TOT) of the code epoch (in GPS system time scale) and the satellite position at that time. Conceptually, the receiver measures the TOAs (according to its own clock) of four satellite signals. From the TOAs and the TOTs, the receiver forms four time of flight (TOF) values, which are (given the speed of light) approximately equivalent to receiver-satellite range differences. The receiver then computes its three-dimensional position and clock deviation from the four TOFs.

For example, satellite 1 sends a signal at time te1. A ground receiver receives the signal from satellite 1 at time tr. The range measurement ρ1 to satellite 1 is represented by equation (1).

$$\rho 1 = (tr - te1) \times \text{speed of light} \qquad (1)$$

Based on one satellite, a location on a sphere with radius ρ1 centered on satellite 1 may be determined. In a similar manner, with range measurement from three satellites, an intersection of three spheres may be calculated. However, the time offset between satellite and receiver clocks is an additional unknown; therefore an observation from a fourth satellite is needed to resolve the time offset.

In practice, the receiver position (in three dimensional Cartesian coordinates with origin at the earth's center) and the offset of the receiver clock relative to GPS system time are computed simultaneously, using the navigation equations to process the TOFs.

The receivers earth-centered solution location is usually converted to latitude, longitude, and height relative to an ellipsoidal earth model. The height may then be further converted to height relative the geoid (e.g., EGM96) (essentially, mean sea level). These coordinates may be displayed, e.g., on a moving map display and/or recorded and/or used by some other system (e.g., a vehicle guidance system).

Baseband signal processing gathers all the algorithms to find and follow a visible GNSS signal, by means of synchronization to the known PRN code, and removing errors as best as possible. This process is built around the principle of signal correlation: the incoming signal is repeatedly correlated with a replica of the expected PRN code, which is known a priori. To extract a valid significance from the correlation, the local replica is generated in the receiver taking into account the signal carrier frequency, code delay, Doppler frequency, and PRN code (which is unique to each satellite/signal).

Most of the satellite constellations, such as: GPS, COMPASS, and GLONASS use 1 ms long PRN (pseudo random number) codes that are used during each correlation phase. However, the GALILEO system uses a 4 ms long PRN code. This may pose some implementation challenges in a hybrid correlator architecture that is intended to be able to function with several different satellite constellations. The processing requirement for a software based radio receiver, which may be expressed as MIPS (millions of instructions per second) may be computed assuming the 1 ms periodicity of computation for the GPS, COMPASS, and GLONASS systems. However, if this approach is used directly in a GALILEO application, it may require a per channel partial sum memory or the correlator may have peak MIPS in one particular frame. A technique disclosed herein describes a way to sequence the correlations in a Galileo system so that the MIPS processing load is evenly distributed without necessitating a per-channel partial sum memory. The embodiment described herein does not increase the correlator size over an implementation based on the traditional approach. Similarly, embodiments of this disclosure may be applied to other GNSS that have correlation sequences that are longer than 1 ms.

An example embodiment of the disclosure may divide the 4 k point correlation required for Galileo operation into four 1 k point correlations. Similarly, the 4 k code delays may be divided into four 1 k point code-lags. This allows processing to be distributed equally by doing correlation for 1 k code lags in one particular millisecond and thus having a similar MIPS requirement for all frames. Since all four partial sums are finished for a channel in the same frame, only one partial sum memory is needed as opposed to one per channel. Details of this scheme will be described in more detail below.

FIG. 1 is a system view 100 of a Global Navigation Satellite system (GNSS). The GNSS system may include a constellation of global positioning system (GPS) satellites, also referred to as space vehicles (SV), and a receiver 150. As mentioned earlier, a different GNSS may include a constellation of Galileo satellites, for example. While five satellites 101-105 are illustrated for simplicity, a typical GNSS constellation may include thirty or more satellites. Receiver 110 may be based on a traditional GNSS receiver architecture that is improved to include an embodiment of the invention. The general GNSS receiver architecture is well known, see, e.g. "Generic Receiver Description", Navipedia, 18 Sep. 2014, which is incorporated by reference herein. The general operation of a GNSS receiver will be briefly described herein to aid in understanding the disclosed improvements.

Receiver 110 may include an Lband antenna 112, which captures GNSS signals, noise, and possible interference. A frontend 114 typically down-converts, filters, amplifies and digitizes the incoming signals. Baseband signal processing 116 utilizes several signal processing routines to acquire and track the different satellite signals.

Depending on the application, an application processor 118 within receiver 110 may perform different tasks with the resulting GNSS information, and provide meaningful results to a user. For example, application processor may interact with a map data base and cause a map to be displayed on a user interface with the user's current location indicated on the map. In another application, application processor 118 may provide location information of receiver 110 to a remote application via a wireless or wired communication interface, for example.

In a typical receiver implementation, the Signals In Space (SIS) arriving at the antenna are down converted, filtered, and digitized in the front end section 114. This process ultimately generates a baseband representation of the desired GNSS spectrum, yielding the samples as real and complex components, namely I (InPhase) and Q (Quadrature) components, in baseband.

Baseband signal processing 116 performs algorithms to find and follow a visible GNSS signal by means of synchronization to the known PRN code, and to remove errors as best as possible. This process is built around the principle of signal correlation: the incoming signal is repeatedly correlated with a replica of the expected PRN code, which is known a priori. To extract valid significance from the correlation, the local replica is generated in the receiver taking into account the signal carrier frequency, code delay, Doppler frequency, and PRN code which is unique to each satellite/signal.

The correlation principle is first used to search for the satellites in view. After a receiver starts operating, it first needs to know which satellites are in view and can be tracked for extracting measurements. This process is known as acquisition, and it is based on several correlations between the incoming signal and multiple replicas of the possible "expected" signals, generated for different code delays and Doppler frequencies. In fact, because the signal is originated by moving satellites, there may be a Doppler and code delay effect observed in the received signals. Therefore, the first two unknowns in detecting GNSS signals is the amount of delay and relative motion between the transmitted signal and the receiver. To search for the signals, different local replicas corresponding to different code delay/Doppler frequency pairs may be generated and correlated with the input signals.

When the local replica and the incoming signal are aligned, their correlation generates a peak and the code delay/Doppler frequency pair corresponding to this peak is assumed to be a good estimate to initialize the tracking process.

In the tracking loops, correlations are also used to refine the local replica generation, so as to match as best as possible the incoming signal. The correlation results are then applied to support different tracking loops in providing a measurement of tracking quality. Typically, the receiver tracks each signal using dedicated channels running in parallel, where each channel tracks one signal (i.e., for single frequency users, each channel tracks one satellite), providing pseudo-range and phase measurements, as well as navigation data and additional signal information, such as carrier-to-noise ratio (C/N0).

After correctly tracking the signals, and returning the measurements and data to application processing block 118, the receiver uses the information from the tracking loops for different purposes: from computing its own position and velocity, to performing time transfer, or simply collecting data to be post-processed at another site, for example.

Correlator Improvements

As GPS capability is added to more and more consumer and user devices, area and MIPS processing needs are a major concern in GNSS receivers. The problem is exaggerated in receivers which support multiple constellations, such as: GPS, Galileo, Compass, and/or Glonass. Correlator requirements vary from one constellation type to another and hence designing an efficient universal correlator may be difficult.

Figure 2A:
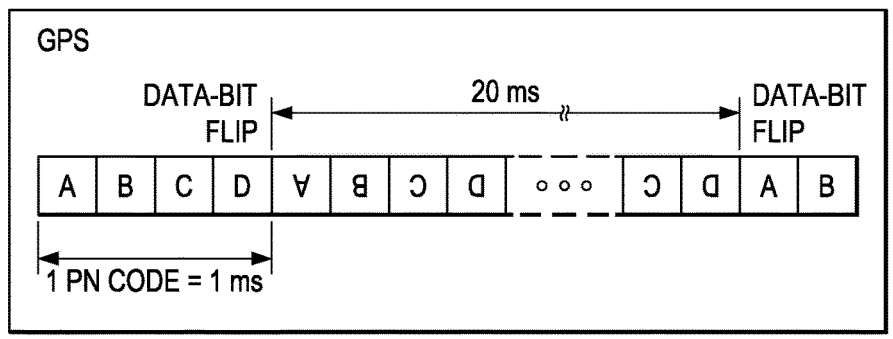
FIGS. 2A-2D illustrate the basic frame structure of various GNSS systems.
Figure 2B:
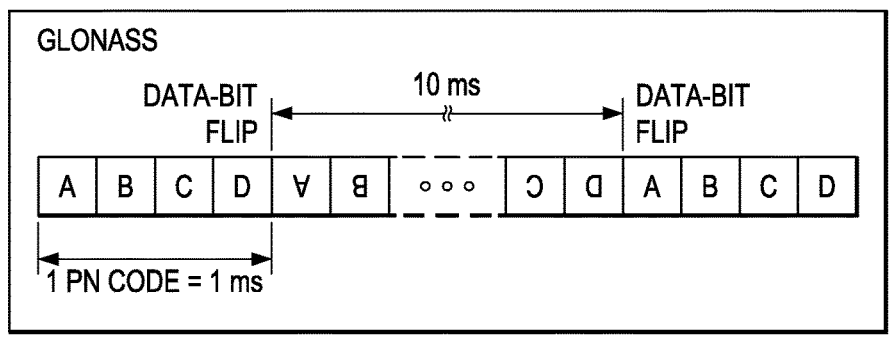
Figure 2C:
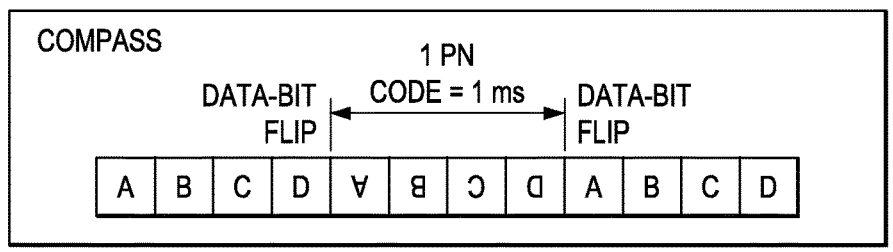
Figure 2D:
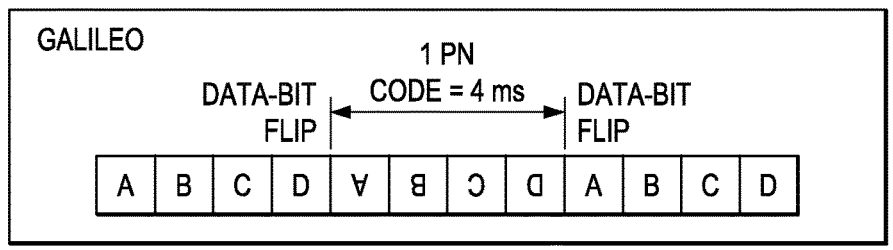

FIGS. 2A-2D illustrate the basic frame structure of various GNSS systems. For example, the pseudorandom-number (PRN) code length for Galileo as illustrated in FIG. 2D is 4 ms, which is four times longer as compared to GPS in FIG. 2A, GLONASS in FIG. 2B, and COMPASS in FIG. 2C. Correlation of this longer PRN may require a bigger correlator engine for a typical single cycle correlation methodology.

Furthermore, Galileo uses BOC (binary offset carrier) modulation as compared to BPSK (binary phase shift keying) in GPS. The main idea behind BOC modulation is to reduce the interference with BPSK-modulated signals, which have a sinc function (also referred to as a sine function) shaped spectrum. Therefore, BPSK-modulated signals such as C/A GPS codes have most of their spectral energy concentrated around the carrier frequency, while BOC-modulated signals have low energy around the carrier frequency and two main spectral lobes further away from the carrier. However, BOC modulation requires a minimum 4 sps (samples per symbol) resolution for correlation to get the advantage of the modulation. So, at least eight times as much memory may be required for Galileo as compared to GPS. For example, GPS uses 1024 (PRN code length)×2(sps) while Galileo uses 4092(PRN code length)×4 (sps).

A typical way of solving the larger correlator engine problem is to use a partial correlation technique. However, partial correlation typically requires memory for storing partial accumulation results which is not otherwise required for Galileo. In Galileo, the PRN and data bit length are the same and synchronized, which means a coherent sum memory is not required for acquisition search.

MIPS requirement for Galileo is much higher as compared to other constellations. Further, MIPS requirement may be determined with a 1 ms periodicity defined by GPS/GLONASS. Thus, if a traditional correlator approach is used, a Galileo correlator may consume peak MIPS in one particular frame/ms, or a per channel partial sum memory may be required.

For example, a brute force correlator approach for Galileo correlation may perform a single cycle large correlation which would be four times the size of a GPS correlation. In this case, no partial/Coherent memory required for Galileo. However, the area overhead may be increased due to a larger correlator that is not required by other constellations. An incoming samples storage buffer sufficient to store nine ms of samples may be required, because eight millisecond samples are required to compute linear convolution for 4K code phases. A correlator typically uses a tapped delay line (TDL) in which data is shifted and compared in order to perform each correlation. A large time may be required to load the TDL at the beginning of each correlation since 4K samples need to be loaded before starting computation. Unfortunately, the larger correlator does not provide any mips spreading benefit. The number of channel allocations is still limited by peak mips in a millisecond.

A one level partial correlator approach may use a partial correlation technique. Multiple partial accumulations across the PRN code length may be computed across four milliseconds to complete the correlation. In this case, the longer PRN codes may be handled with no overhead on correlator engine size. For example, they may be performed in a similar manner to GPS using 1K samples for each partial correlation. Unfortunately, this approach may require a significantly large partial/coherent accumulation memory in which to accumulate the four 1K size partial correlations to order to get a final 4 ms (4K) size full correlation result. Partial sums are required to be retained in the memory across four milliseconds to complete the correlation.

Figure 3:
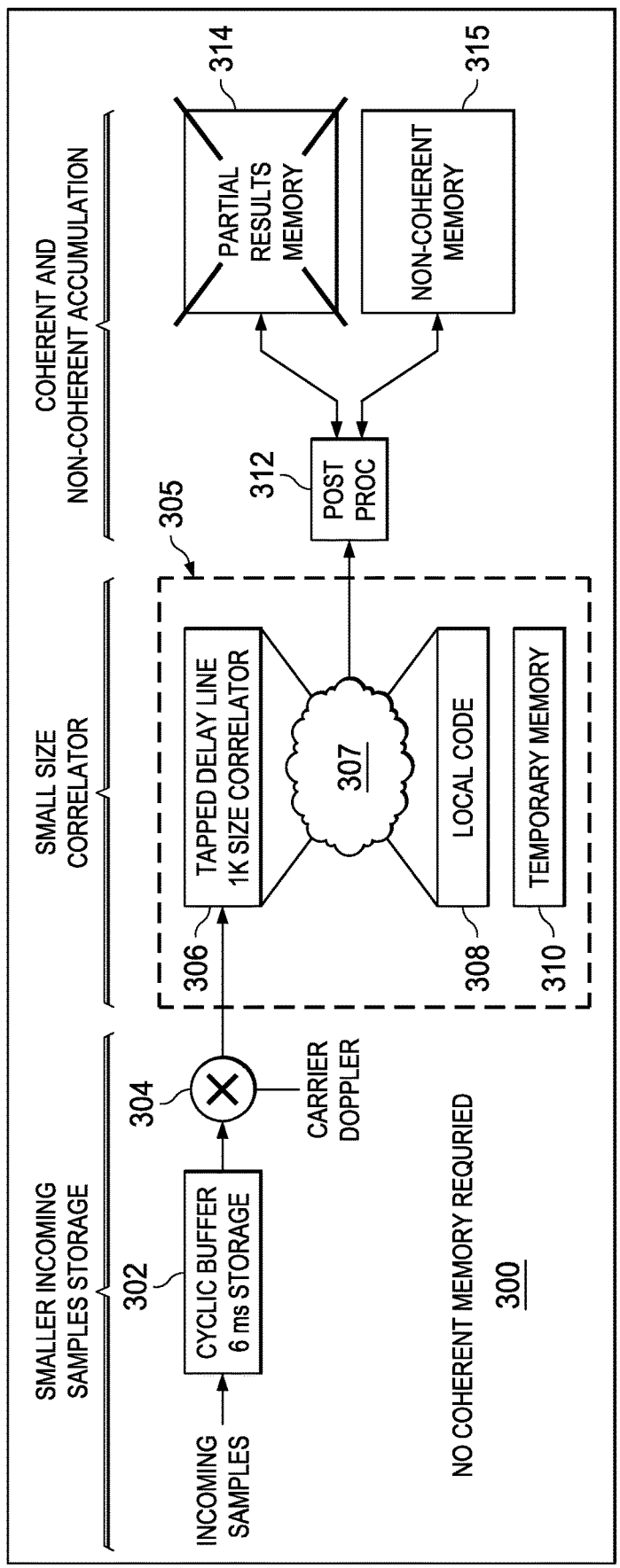
FIG. 3 is a block diagram of an improved GPS correlator that is configured to perform Galileo correlation using two levels of partial correlation technique.

FIG. 3 is a block diagram of an improved GPS correlator 300 that is configured to perform Galileo correlation using two levels of partial correlation technique. In this technique, four partial correlations are computed and accumulated in temporary memory 310 to get the complete correlation result for 1023 code phases, which is ¼th of the total PRN code. Incoming samples received from a radio receiver that is receiving GPS satellite transmissions are stored in cyclic buffer 302. In this example, cyclic buffer 302 is large enough to store 6 ms worth of incoming data samples for a given satellite channel.

The received samples are then mixed 304 with an assumed Doppler frequency. The Doppler frequency may be determined during an acquisition period by trying several combinations of code delay and Doppler frequency combinations. Doppler frequency is determined as a part of acquisition and is decided based on correlation peak output. The correlator searches a range of doppler hypothesis in a similar manner as that of PRN code search. For example, the correlator may search all 4096 code delays with a complete range of doppler frequencies according to a maximum uncertainty based on worst case relative velocity between satellite and user. Doppler hypothesis search bandwidth is dependent upon the number of coherent integrations. It's a complicated algorithm which trades off the number of coherent integrations and the acquisition sensitivity. More coherent integrations are required to find the weaker satellite signals but it reduces the search bandwidth for doppler, which requires searching more doppler hypothesis to cover the complete doppler uncertainty.

Once a Doppler frequency assumption is verified during an acquisition phase, that Doppler frequency may be used for a period of time during a tracking phase depending on how often the speed and direction of the receiver relative to the satellite changes.

Correlator engine 305 includes TDL 306, correlation register 308, correlation logic 307 and temporary memory 310. TDL 306 is loaded with 1 k modified data samples, corresponding to 1 ms of time, from mixer 304. One fourth of a local PRN code for an expected satellite channel is stored in register 308. Correlation logic 307 performs a symbol by symbol computation of the 1 k samples in TDL 306 and code register 308 to determine a level of match. TDL 306 is then shifted by one position and the correlation to the code register 308 is again performed. This process of shifting and comparing is repeated for all of the samples in TDL 306 looking for a peak that indicates a match between the received samples and the local PRN code.

Take a case of two vectors/arrays A[0 to 4091] and B[0 to 4091], where vector A represents an incoming satellite channel and vector B represents a local PRN code corresponding to a satellite channel. Conceptually, for a complete correlation for one PRN code phase, a correlation is performed for A0×B0+A1×B1+A2×B2 . . . A4091×B4091.

Vector A is then shifted one sample for code phase 2, and a correlation is performed for A1×B0+A2×B1+A3×B2 . . . A4092×B4091. A4092 is actually A0 of a next PRN code frame. In this manner, the A samples are shifted with respect to B samples to get the correlation results for all 4092 code phases. Processing logic 312 processes the sum of the pairs at each shift position and may then determine the maximum value of the correlation result and store the result in memory 315. The maximum value of the correlation result for all 4092 phases may then be reported to a higher level processing system (not shown) as a code phase match value. If the match value is above a threshold, then it may indicate the time of arrival for the satellite signal which may then be used to calculate a TOF value for the channel. The position of the receiver may then be calculated using known or later developed 2D or 3D positioning techniques.

As mentioned above, one approach to save correlator area achieves correlation by partial correlation across 4 ms. In this approach, the TDL is first loaded with A0 . . . A1022 samples which are correlated with B0 . . . B1022 as per the conceptual mathematical operation described above. After a shift, a correlation is performed on A1 . . . A1023 with B0 to B1022 and so on until last code phase partial correlation of A4091 . . . A1021 with B0 . . . B1022. This produces 4092 code phases of partial correlation results with 1023 samples. During the next millisecond, a second partial correlation is performed for all 4092 code phases with A1023 . . . A2045 and B1023 . . . B2045, A1024 . . . A2046 with B1023 . . . B2045 and so on. Repeating this operation for another two milliseconds produces complete correlation results for all 4092 code phases. A limitation of this approach is that the partial results for each of the 1 ms computations needs to be kept in memory so that the correlator engine can be time division multiplexed across multiple satellite/channel searches. For example, a large block of partial results memory 314 may be required to hold the partial results for all active channel searches.

An improved two level partial correlation that will now be described in more detail eliminates the need for the large block of partial storage memory 314. This improved technique involves a rearrangement of all the above mentioned mathematical operations.

In the first level of partial correlation, a correlation is performed on A0 . . . A1022 with B0 . . . B1022, then a correlation is performed on A1 . . . A1023 with B0 . . . B1022, etc, through A1023 . . . A2045 with B0 . . . B1022, in a similar manner as described above.

However, for the next quadrant of the A vector, the B vector is swapped from B0 . . . B1022 to B1023 . . . B2045 and a partial correlation with the second quadrant of the A vector is performed, such that a correlation is performed on A1023 . . . A2045 with B1023 . . . B2045, A1024 . . . A2046 with B1023 . . . B2045, etc until A2046 . . . A3068 is correlated with B1023 . . . B2045. This results in a second partial correlation using the second 1023 code phases. This same process is repeated for the third quadrant of the B vector (B2046-B3068) and then repeated again for the fourth quadrant of the B vector (B3069-B4091) to form four sets of partial results for A0-A1022. These four partial results may then be combined to form a complete correlation for the first quadrant of the A vector, A0-A1022. This entire process is performed in one millisecond.

During the next one millisecond, the first quadrant of the B vector, B0 . . . B1022 is again loaded into correlation register 308. TDL 306 is loaded with the second quadrant of the A vector, A1023-A2045. A correlation is performed on A1023-A2045 with B0 . . . B1022, then a correlation is performed on A1024-A2046 with B0 . . . B1022, etc, through A2046-A3068 with B0 . . . B1022, in a similar manner as described above. Correlation register 308 is then loaded with the second quadrant of the B vector, B1023-B2045, and a correlation is performed as described above. This same process is repeated for the third quadrant of the B vector (B2046-B3068) and then repeated again for the fourth quadrant of the B vector (B3069-B4091) to form four sets of partial results for A1023-A2045. These four partial results may then be combined to form a complete correlation for the second quadrant of the A vector, A1023-A2045. This entire process is performed in one millisecond.

During the third and fourth milliseconds, this process is again repeated for the third quadrant of the A vector, A2046-A3068 and for the fourth quadrant of the A vector, A3069-A4091.

Thus, after four milliseconds, a complete correlation of the entire 4 k A vector is produced using only a 1 k TDL correlator. In summary, the difference is rather than doing the partial correlation results for all the code phases, a complete correlation is performed for partial code phases in one millisecond. This removes the need for coherent accumulation memory 314.

Figure 4:
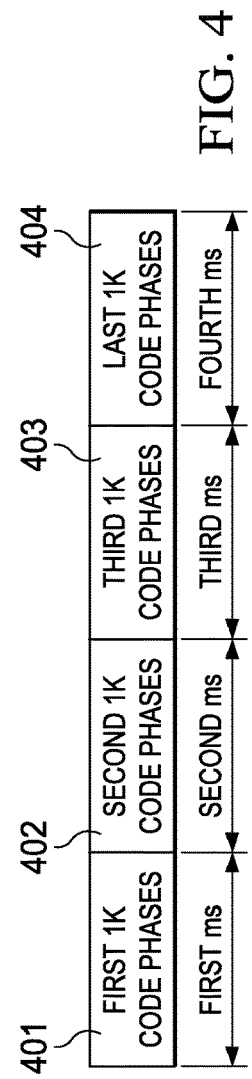
FIG. 4 is a timeline illustrating partial correlation processing across four milliseconds.

FIG. 4 is a timeline illustrating partial processing across four milliseconds. Every millisecond, 1023 code phases are computed and stored in temporary data memory 310, referring again to FIG. 3. As described above, during the first ms 401, a complete correlation for the first quadrant, A0-A1022 is produced. During the second ms 402, a complete correlation for the second quadrant, A1023-A2045 is produced. During the third ms 403, a complete correlation for the third quadrant, A2046-A3068 is produced. During the fourth ms 404, a complete correlation for the fourth quadrant, A3069-A4091 is produced.

Figure 5:
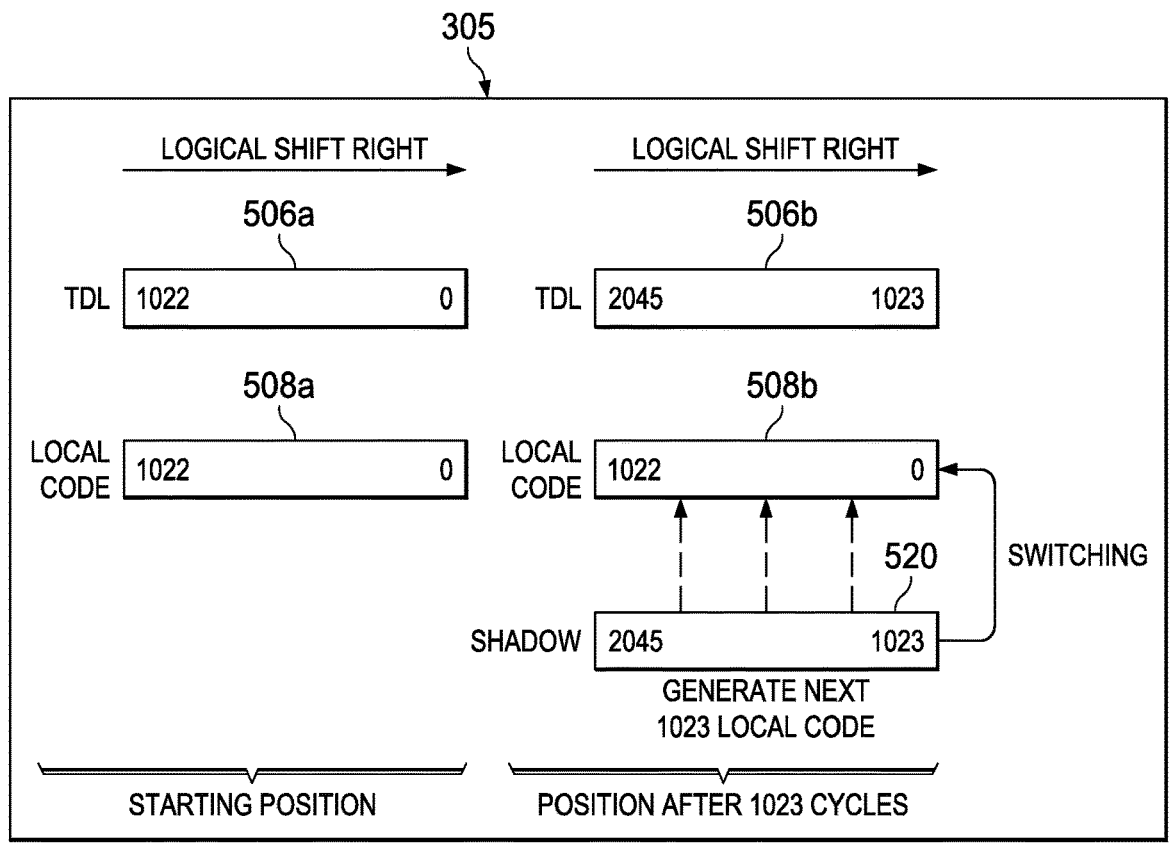
FIG. 5 illustrating operation of a 1 k bit correlator for Galileo correlation.

FIG. 5 illustrating operation of 1 k bit correlator 305 for Galileo correlation in more detail. As discussed above, TDL 306, referring again to FIG. 3, is first loaded with the first quadrant of the A vector, A0-A1022, as illustrated at 506*a*. Correlation register 308, referring again to FIG. 3, is loaded with the first quadrant of the B vector, B0-B1022, as illustrated at 508*a*. During a first ms, correlation is performed as described above by shifting TDL 305 1023 times until it holds A1023-A2045, as illustrated at 506*b*, while maintaining the first quadrant of the B vector, as indicated at 508*b*, to form a partial correlation result for 1023 code ($\frac{1}{4}^{th}$) phases.

The correlation register 308 is then loaded with the second quadrant of the B vector, B1023-B2045. This may be done by transferring the contents of a shadow register 520, or from another memory location such as temp memory 310, for example. Alternatively, there may be four correlation registers that each holds one quadrant of the B vector. Multiplexor logic may then be used to access each correlation register as needed during each four millisecond correlation process.

This process continues as described above during first ms. Four partial correlations are computed and accumulated in temporary memory 310, referring again to FIG. 3, to produce a complete correlation for the first quadrant of the 4 k code received from a Galileo satellite. Memory 510 is configured to hold 1023 samples worth partial results. In this manner, computation is uniformly spread across multiple milliseconds.

This process is then repeated as described above during the second, third and fourth milliseconds to produce a complete correlation for the respective second, third and fourth quadrants of the 4 k code received from the Galileo satellite. Thus, after four milliseconds, a complete correlation is produced using only a 1023 bit TDL without saving intermediate results.

Figure 6:
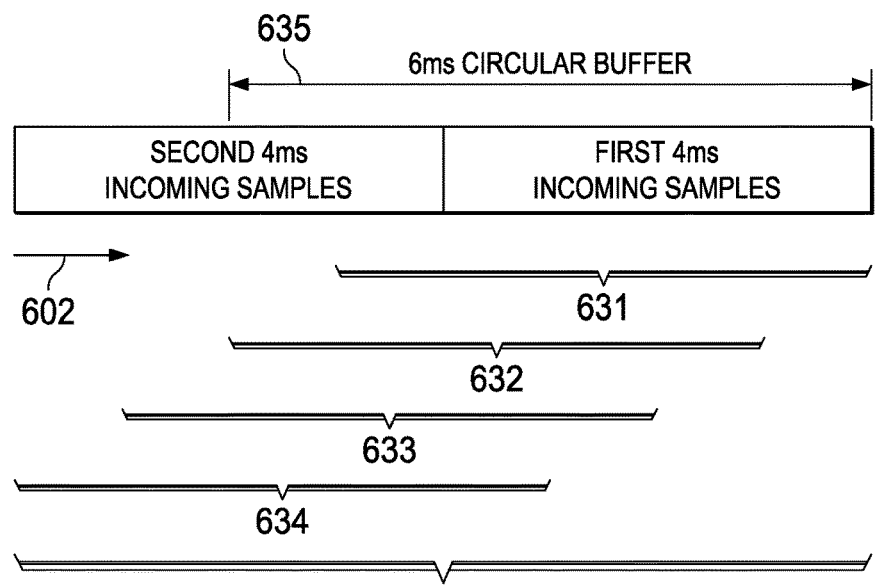
FIG. 6 is a timing diagram illustrating storage of incoming samples for the correlator of FIG. 3.

FIG. 6 is a timing diagram illustrating storage of incoming samples in circular buffer 302 of FIG. 3. A continuous stream of data is received from a satellite receiver, not shown, and stored in circular buffer 302 as indicated at 602. As discussed above, a Galileo code block is 4 ms long. As discussed in more detail above, improved correlator 305 only needs to have 6 ms worth of incoming data available at any one time, as indicated at 635.

During the first millisecond of a correlation, 5 ms worth of data samples 631 are used by correlator 305 as described above. During a second millisecond, a later 5 ms worth of data sample 632 are used by correlator 305. During a third millisecond, a later 5 ms worth of data sample 633 are used by correlator 305. During a fourth millisecond, a later 5 ms worth of data sample 634 are used by correlator 305. Since the incoming Galileo code pattern is repeated each 4 ms, there is no need to store more than 6 ms worth of sample data.

In this manner, the correlator architecture disclosed herein breaks down the correlation operation into two levels of partial correlations. The first correlation of a partial code phase is performed within a millisecond (across PRN code) and the second partial correlations are performed across milliseconds (across code phases).

The architecture uses the partial correlation in such a way that a lesser number of code phases is processed each millisecond, but the complete correlation results are computed rather than computing partial correlation results across all code phases in a millisecond.

Although the Galileo signal structure computation requirement is significantly high as compared to other constellations, a correlator engine as disclosed herein need not carry an extra burden for supporting Galileo. There is only minimal overhead due to small local code storage and temporary memory.

The architecture as disclosed herein is scalable to new upcoming GNSS constellations with PRN codes as long as 10 ms. Furthermore, the disclosed architecture is not limited to Galileo only.

Table 1 illustrates basic requirements for the various correlator architectures discussed herein. As can be seen, the two level architecture disclosed herein requires only a small incoming sample storage memory and only a moderate level of processing and memory needs as compared to other options.

TABLE 1 comparison of Correlator architectures

| Items | Brute Force | One level partial correlation | Two level partial correlation |
| --- | --- | --- | --- |
| Incoming samples storage | 36 KB | 24 KB | 24 KB |
| Correlator Size | 36K Flops | 9K Flops | 10K Flops |
| Data Memory (per channel in 4sps mode) | 48 KB | 96 KB | 48 KB |

System Example

Figure 7:
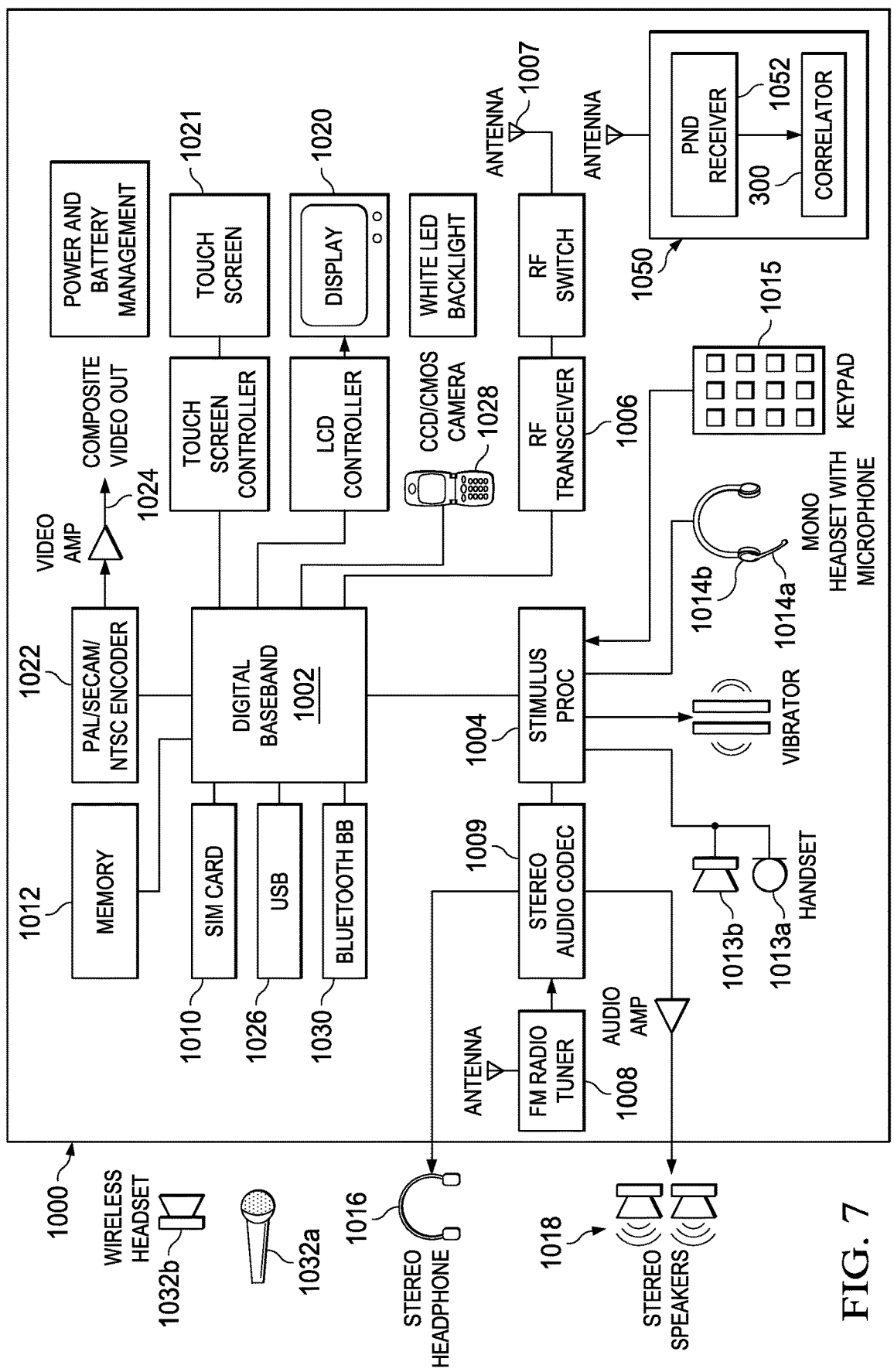
FIG. 7 is a block diagram of a user device that includes a personal navigation device.

FIG. 7 is a block diagram of an exemplary mobile cellular phone 1000 that includes an embodiment of the present invention. Digital baseband (DBB) unit 1002 may include a digital processing processor system (DSP) that includes embedded memory and security features. Stimulus Processing (SP) unit 1004 receives a voice data stream from handset microphone 1013a and sends a voice data stream to handset mono speaker 1013b. SP unit 1004 also receives a voice data stream from microphone 1014a and sends a voice data stream to mono headset 1014b. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

Personal navigation device (PND) 1050 may be implemented as described above for processing of Galileo and other GNNS formats. Position/trajectory information determined by PND 1050 may be displayed on display 1020, for example. PND receiver 1050 may include satellite receiver 1052 and correlator 300, as described above in more detail. Application processing may be performed by a processor within PND 1050, or by processor 1002, for example.

RF transceiver 1006 is a digital radio processor and includes a receiver for receiving a stream of coded data frames from a cellular base station via antenna 1007 and a transmitter for transmitting a stream of coded data frames to the cellular base station via antenna 1007. RF transceiver 1006 is coupled to DBB 1002 which provides processing of the frames of encoded data being received and transmitted by cell phone 1000.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032a and headset 1032b for sending and receiving voice data. DBB 1002 can also be connected to display 1020 and can send information to it for interaction with a user of the mobile UE 1000 during a call process. Touch screen 1021 may be connected to DBB 1002 for haptic feedback. Display 1020 may also display pictures received from the network, from a local camera 1028, or from other sources such as USB 1026. DBB 1002 may also send a video stream to display 1020 that is received from various sources such as the cellular network via RF transceiver 1006 or camera 1028. DBB 1002 may also send a video stream to an external video display unit via encoder 1022 over composite output terminal 1024. Encoder unit 1022 can provide encoding according to PAL/SECAM/NTSC video standards. In some embodiments, audio codec 1009 receives an audio stream from FM Radio tuner 1008 and sends an audio stream to stereo headset 1016 and/or stereo speakers 1018. In other embodiments, there may be other sources of an audio stream, such a compact disc (CD) player, a solid state memory module, etc.

Other Embodiments

While the invention has been described with reference to illustrative embodiments, this description is not intended to be construed in a limiting sense. Various other embodiments of the invention will be apparent to persons skilled in the art upon reference to this description. For example, positioning information may be received from space vehicles or land based sources. Land based sources may include WiFi sources in which the fixed position of the source is known and correlated to the MAC address of the WiFi source. In this case, the position engine may perform triangulation of three-five WiFi sources in order to determine a position.

While a Galileo GNSS was described herein, there are other systems that exist or are planned that may use correlation sequences that are longer than 1 ms. Alternative embodiments of the techniques disclosed herein may be use to operate with other GNSS that have longer correlation sequences.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Embodiments of the correlator and methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized accelerators. A stored program in an onboard or external (flash EEP) ROM or FRAM may be used to implement aspects of the static heading detection processing. Analog-to-digital converters and digital-to-analog converters provide coupling to the real world, modulators and demodulators (plus antennas for air interfaces) can provide coupling for waveform reception of position data being broadcast over the air by satellite, TV stations, cellular networks, etc or via WiFi networks such as the Internet.

An embodiment may be implemented in a single integrated circuit (IC) using known or later developed processing and fabrication techniques. A single IC may include the correlator as disclosed herein along with processors, memories, peripherals, etc to form a System On a Chip (SOC), for example.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method comprising:
receiving, by a global navigation satellite system receiver, a signal from a navigation beacon of a global navigation satellite system (GNSS) having a code word;
processing, by the GNSS receiver, the received signal to form a sequence of N code samples;
during a first time period, the first time period is one millisecond in length:
correlating, by the GNSS receiver, a first subset of the sequence of N code samples with a first set of pseudorandom number code phase;
shifting, by the GNSS receiver, the first subset of the sequence of N code samples by a single code sample; and
correlating, by the GNSS receiver, the shifted first subset of the sequence of N code samples with the first set of pseudorandom number code phase;
generating, by the GNSS receiver, a first partial correlation for the first subset of the sequence of N code samples;
correlating, by the GNSS receiver, the first subset of the sequence of N code samples with a second set of pseudorandom number code phase;
shifting, by the GNSS receiver, the first subset of the sequence of N code samples by a single code sample;
correlating, by the GNSS receiver, the shifted first subset of the sequence of N code samples with the second set of pseudorandom number code phase;
generating, by the GNSS receiver, a second partial correlation for the first subset of the sequence of N code samples;
combining, by the GNSS receiver, at least the first and second partial correlations for the first subset of the sequence of N code samples to form a complete correlation for the first subset of the sequence of N code samples;
during a second time period, the second time period is one millisecond in length:
correlating, by the GNSS receiver, a second subset of the sequence of N code samples with the first set of pseudorandom number code phase;
shifting, by the GNSS receiver, the second subset of the sequence of N code samples by a single code sample;
correlating, by the GNSS receiver, the shifted second subset of the sequence of N code samples with the first set of pseudorandom number code phase;
generating, by the GNSS receiver, a first partial correlation for the second subset of the sequence of N code samples;
correlating, by the GNSS receiver, the second subset of the sequence of N code samples with a second set of pseudorandom number code phase;

shifting, by the GNSS receiver, the second subset of the sequence of N code samples by a single code sample;
correlating, by the GNSS receiver, the shifted second subset of the sequence of N code samples with the second set of pseudorandom number code phase;
generating, by the GNSS receiver, a second partial correlation for the second subset of the sequence of N code samples;
combining, by the GNSS receiver, at least the first and second partial correlations for the second subset of the sequence of N code samples to form a complete correlation for the second subset of the sequence of N code samples; and
determining, by the GNSS receiver, a correlation value using the at least the complete correlation for the first subset of the sequence of N code samples and the complete correlation of the second subset of the sequence of N code samples.

2. The method of claim 1, wherein the GNSS is a Galileo system.

3. The method of claim 1, further comprising:
determining, by the global navigation satellite system receiver, a Doppler frequency during an acquisition period; and
mixing, by the global navigation satellite system receiver, the received signal with the determined Doppler frequency.

4. The method of claim 1, further comprising storing, by the global navigation satellite system receiver, the sequence of N code samples in a cyclic buffer.

5. A system comprising:
a radio receiver configured to:
receive a signal from a global navigation satellite system (GNSS) having a code word; and
process the received signal to form a sequence of N code samples;
a correlator coupled to the receiver;
control logic coupled to the correlator and configured to cause the correlator to:
during a first time period, the first time period is one millisecond in length:
correlate a first subset of the sequence of N code samples with a first set of pseudorandom number code phase;
shift the first subset of the sequence of N code samples by a single code sample; and
correlate the shifted first subset of the sequence of N code samples with the first set of pseudorandom number code phase;
generate a first partial correlation result for the first subset of N code samples;
correlate the first subset of the sequence of N code samples with a second set of pseudorandom number code phase;
shift the first subset of the sequence of N code samples by a single code sample; and
correlate the shifted first subset of the sequence of N code samples with the second set of pseudorandom number code phase;
generate a second partial correlation result for the first subset of N code samples;
combine at least the first and second partial correlation results for the first subset of the sequence of N code samples to form a complete correlation result for the first subset of the sequence of N code samples;

during a second time period, the second time period is one millisecond in length:
correlate a second subset of the sequence of N code samples with the first set of pseudorandom number code phase;
shift the second subset of the sequence of N code samples by a single code sample;
correlate the shifted second subset of the sequence of N code samples with the first set of pseudorandom number code phase;
correlate the second subset of the sequence of N code samples with the second set of pseudorandom number code phase;
shift the second subset of the sequence of N code samples by a single code sample;
correlate the shifted second subset of the sequence of N code samples with the second set of pseudorandom number code phase;
generate a second partial correlation result for the second subset of N code samples;
combine at least the first and second partial correlation results for the second subset of the sequence of N code samples to form a complete correlation result for the second subset of the sequence of N code samples; and
determine a correlation value using the at least the complete correlation result for the first subset of the sequence of N code samples and the complete correlation result for the second subset of the sequence of N code samples.

6. The system of claim 5, in which the GNSS is a Galileo system.

7. The system of claim 5, further comprising:
application processing logic coupled to receive the correlation value determined by the correlator; and
a display screen coupled to the application processing logic.

8. The system of claim 5, wherein the radio receiver is further configured to:
determining a Doppler frequency during an acquisition period; and
mixing the received signal with the determined Doppler frequency.

9. The system of claim 5, wherein the radio receiver is further configured to store the sequence of N code samples in a cyclic buffer.

10. A mobile device comprising:
a radio receiver configured to:
receive signals from the global navigation satellite system (GNSS) containing a code word; and
process the received signal to form a sequence of N code samples;
a correlator coupled to the receiver;
control logic configured to cause the correlator to:
during a first time period, the first time period is one millisecond in length:
correlate a first subset of the sequence of N code samples with a first set of pseudorandom number code phase;
shift the first subset of the sequence of N code samples by a single code sample;
correlate the shifted first subset of the sequence of N code samples with the first set of pseudorandom number code phase;
generate a first partial correlation result for the first subset of the sequence of N code samples;

correlate the a first subset of the sequence of N code samples with a second set of pseudorandom number code phase;

shift the first subset of the sequence of N code samples by a single code sample;

correlate the shifted first subset of the sequence of N code samples with the second set of pseudorandom number code phase;

generate a second partial correlation result for the first subset of the sequence of N code samples;

using at least the first and second partial correlation results, generate a complete correlation result for the first subset of the sequence of N code samples;

during a second time period, the second time period is one millisecond in length:

correlate a second subset of the sequence of N code samples with the first set of pseudorandom number code phase;

shift the second subset of the sequence of N code samples by a single code sample; and correlate the shifted second subset of the sequence of N code samples with the first set of pseudorandom number code phase;

generate a first partial correlation results for the second subset of the sequence of N code samples;

correlate the second subset of the sequence of N code samples with a second set of pseudorandom number code phase;

shift the second subset of the sequence of N code samples by a single code sample; and correlate the shifted second subset of the sequence of N code samples with the second set of pseudorandom number code phase;

generate a second partial correlation results for the second subset of the sequence of N code samples;

using at least the first and second partial correlation results, generate a complete correlation result for the second subset of N code samples; and determine a correlation value using at least the complete correlation result for the first subset of the sequence of N code samples and the complete correlation result of the second subset of the sequence N code samples.

11. The mobile device of claim 10, in which the GNSS is a Galileo system four.

12. The mobile device of claim 10, wherein the radio receiver is further configured to:

determine a Doppler frequency during an acquisition period; and mix the received signal with the determined Doppler frequency.

* * * * *